ELECTRICAL SWITCH MECHANISM WITH RADIO FREQUENCY SHIELDING

Filed Dec. 18, 1968 4 Sheets-Sheet 1

INVENTOR.
Michael Baldasare
BY
Mattern, Ware & Davis
ATTORNEYS 3,542,988

ELECTRICAL SWITCH MECHANISM WITH RADIO FREQUENCY SHIELDING

Michael Baldasare, Danbury, Conn., assignor to The Capitol Machine and Switch Company, Danbury, Conn.

Filed Dec. 18, 1968, Ser. No. 784,603
Int. Cl. H01h 9/02
U.S. Cl. 200—168 11 Claims

ABSTRACT OF THE DISCLOSURE

An electrical switch of the push-push or momentary type has an internal light source to illuminate the switch button and a special shielding structure for use in environments which cannot tolerate emission of radio frequency interference from the switch. The shielding structure, however, does not interfere with the push-push action of the actuator button, nor does it interfere with the external display illumination of the button by the internal light bulb. The switching mechanism is enclosed within a metal can which surrounds it on all sides, but is open at the top and partially open at the bottom end. A pushbutton formed of a translucent insulating material rides in the open top of the shielding can. A conductive shielding element inboard of the pushbutton is assembled therewith, and comprises a conductive screen which transmits light while serving as a radiation shield. The shielding element makes slidable contact with the inside of the can on all sides to preserve the shielding relationship while moving integrally with the pushbutton.

FIELD OF THE INVENTION

This invention relates generally to electrical switching, and is particularly concerned with an illuminated switch mechanism incorporating shielding to prevent the emission of radio frequency interference.

THE PRIOR ART

Certain types of electronic equipment, such as high speed electronic digital computers, communication equipment and the like, are particularly subject to the adverse effects of radio frequency interference emitted by nearly electrical switching mechanisms. Such interference is difficult to avoid, since switching mechanisms which generate such interference are required to be nearby in order to control the very same equipment which is to be protected from such interference. Accordingly, it is necessary to provide electrostatic shielding for the switching mechanisms so as to prevent the escape of radio frequency interference.

Some switching mechanisms in current use are provided with illuminated displays in the form of an internal light source which shines through a translucent display member to call attention to the switch. Frequently, the translucent display member also serves as the manual pushbutton for operating the switch. Switches of this type present an additional problem when it is desired to shield them against the emission of radio frequency interference, because the circuitry associated with the light source provides an additional source of radiation. Therefore, the light source and its associated circuit must be within the shielded enclosure, yet the shielding must not interfere with the illumination of the external pushbutton by the internal light source.

Apart from the problems of the light source, there is also the difficulty of providing shielding which does not interfere with the switch-actuating movement of the pushbutton. Complete enclosure must be provided to prevent the escape of radiation, yet parts of the protective shield must be relatively movable to permit switch operation.

SUMMARY AND OBJECTS OF THE INVENTION

It is therefore an object of this invention to provide an electrical switching mechanism which is shielded against the escape of radio frequency interference. Another object is to provide an internally illuminated switch which is shielded against RFI. Another object is to provide a switching mechanism which operates in the push-push mode and which is shielded against the escape of RFI, but in which the shielding does not interfere with the motion of the switch pushbutton. Still another object is to provide an illuminated switch in which improved means are provided for housing the internal light source and for guiding the light emitted by the source through the interior of the switching mechanism to the desired illuminated display target. An additional object is to provide improved internal mechanism for a switch of the kind described, which guides the motion of the switch pushbutton, detents the switch in various operating positions, cams the electrical contacts through their operative movements, and houses the light source and directs the light rays emitted by that source.

The invention has additional objects and features which may best be appreciated from the following detailed description and the accompanying drawings.

DETAILED DESCRIPTION OF THE PREFERRED EMBODIMENT

Figure 1:
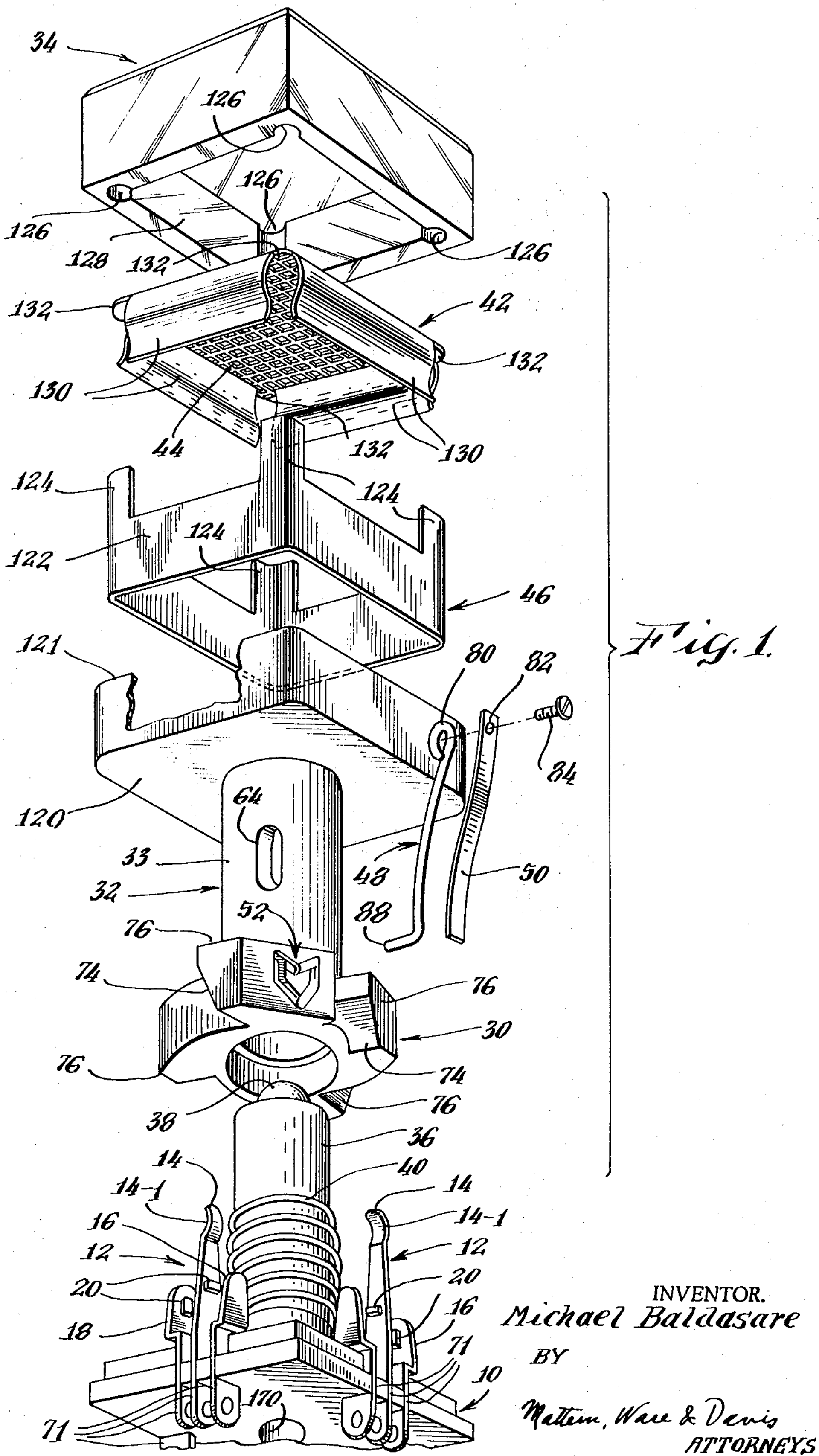
FIG. 1 is an exploded perspective view of the internal actuating mechanism of an electrical switch in accordance with this invention.

In general terms, the internal mechanism of the present switch (FIG. 1) comprises a molded plastic base 10 bearing four groups of electrical switch contacts 12. The switch contacts are operated by a camming collar 30 at the lower end of a plunger 32 which in turn is reciprocated axially by means of a translucent manual pushbutton 34. A hollow cylindrical guide 36 acts as a housing for a light bulb 38 which shines upwardly through the interior of plunger 32 to illuminate the pushbutton 34. The cylinder 36 also serves as a guide for the reciprocation of the plunger 32, and supports a coil spring 40 which biases the collar 30 and plunger 32 upwardly. An element 42 serves as a radio frequency interference shield, but has a central screen 44 which permits the passage of light from the bulb 38 to pushbutton 34. An element 46 serves to retain the pushbutton 34, the shield 42 and the plunger 32 in assembled relationship. Two discrete operating positions of the pushbutton assembly, actuated and unactuated, are established by a detenting finger 48 which is biased by a leaf spring 50 and cooperates with a heart-shaped cam track 52.

Figure 2:
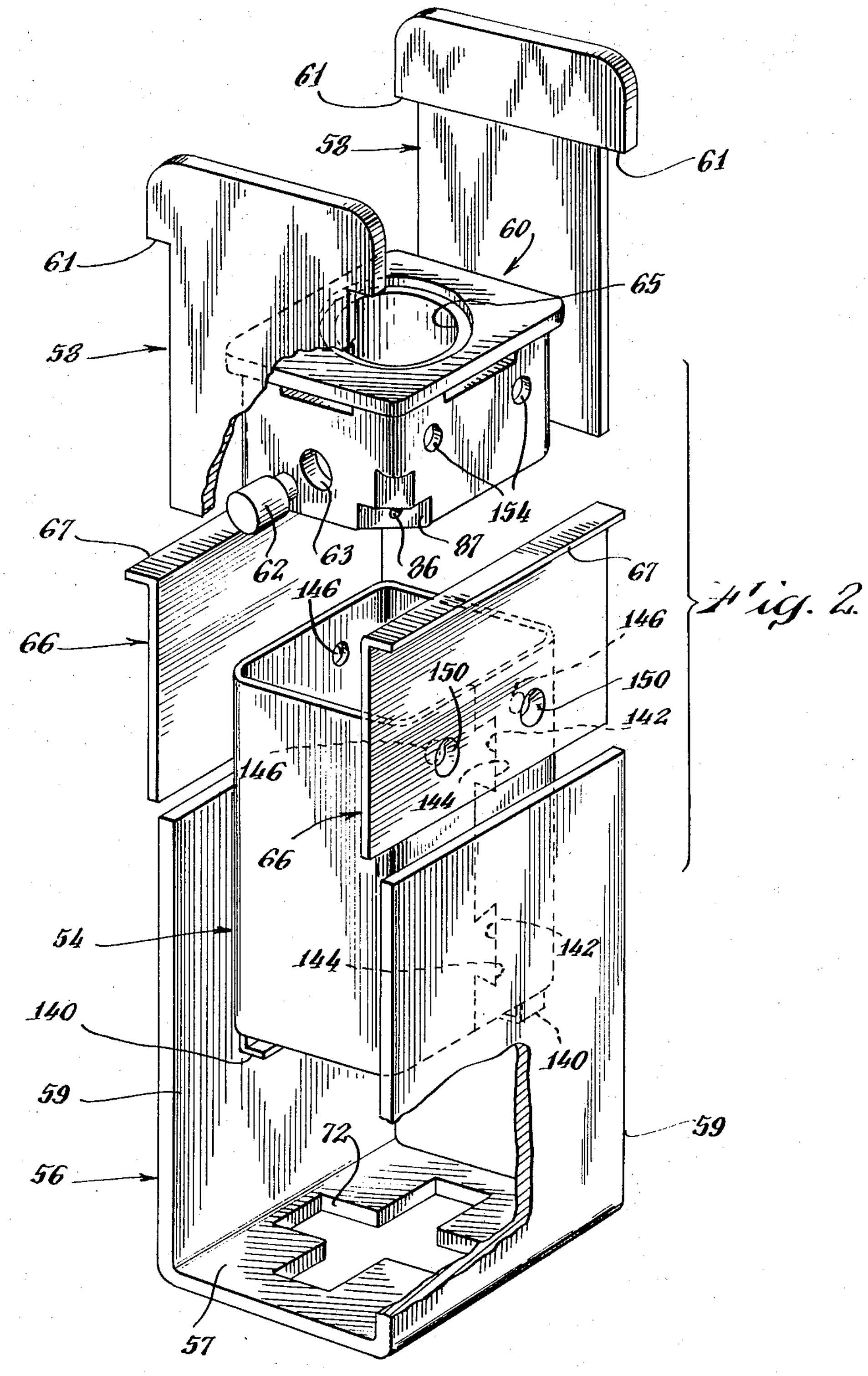
FIG. 2 is another exploded perspective view showing the external housing and shielding components of the same switch.
Figures 3, 4, 5:
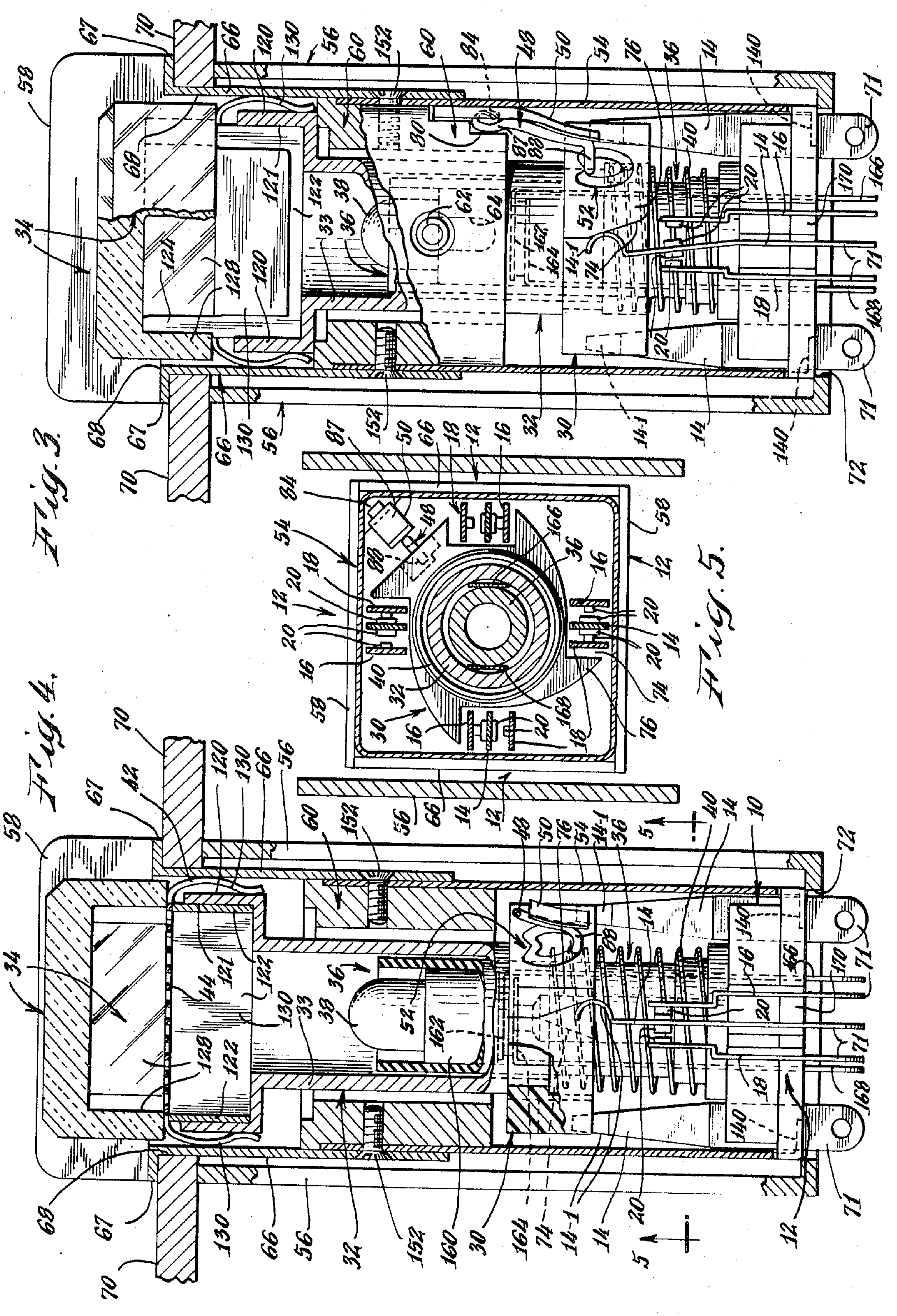
FIG. 3 is a vertical section of the switch of the previous figures, showing the mechanism in its actuated condition.
FIG. 4 is a similar vertical section, showing the mechanism in its unactuated condition.
FIG. 5 is a horizontal section taken through the same switch along the lines 5—5 of FIG. 4, looking in the direction indicated by the arrows.

The external components of the switching mechanism (FIG. 2) generally comprise a cam 54 which surrounds the electrical switch contacts 12 and the light bulb 38 on all four sides. In addition there is a U-shaped structural enclosure 56 comprising upstanding walls 59 which embrace the switching mechanism on two sides and a connecting web 57 extending across the bottom thereof. A pair of side panels 58 enclose the other two sides of the switch. A box-like element 60 has a central opening 65 to pass light from the bulb 38, and is located in the interior of the switch mechanism to lock the plunger 32 and its camming collar 30 against rotational movement relative to the outer enclosure just described, while still permitting it to reciprocate axially. Note the connecting pin 62 which passes through an opening 63 formed in the box element. This pin engages an elongated slot 64 formed in the side of the cylindrical tube 33 of plunger 32 (FIG. 1) to accomplish a slidable but non-rotatable connection thereto. Finally, a pair of hanger elements 66 which are fastened to box element 60 have flanges 67 which serve to suspend the entire switch mechanism within a slot 68 formed in a horizontal panel board 70, as best seen in FIGS. 3 and 4. The side panels 58 are not fastened in place, but are formed with shoulders 61 which engage panel board 70 to suspend the side panels within the slot 68 (see FIGS 2 and 6).

Each group 12 of switch contacts includes a movable blade 14 and a pair of stationary blades 16 and 18 on either side of the movable blade. Contact buttotns 20 are provided on each of the stationary blades 16 and 18 facing the movable blade 14, and cooperating contact buttons 20 are provided on opposite surfaces of the movable blades 14. The contact buttons 20 are made of special hard, corrosion resistant and arc resistant materials of the kind normally used in the electrical industry for electrical switching service. In the unactuated position of each movable blade 14, one of the buttons 20 thereof makes contact with the facing button 20 of the associated stationary blade 16. When the switch mechanism is operated, the movable blade 14 of each group is deflected so that it breaks electrical contact with the stationary blade 16 and the button 20 on the opposite side thereof engages the button 20.

The lower end of each of the switch blades 14, 16 and 18 depends from the plastic base 10 to serve as an electrical connecting post. The bottom surface of the enclosure member 56 is formed with a cruiform opening 72 having four arms which provide respective openings for the groups of depending prongs 71 to project downwardly therethrough.

The movable switch blades 14 are formed with curved tips 14–1 which serve as camming surfaces to deflect the blades. When the plunger 32 is driven downwardly by the pushbutton 34, these curved tips 14–1 are engaged by camming surfaces 74 formed on each of four studs 76 projecting laterally from the camming collar 30. The interior of the hollow stem 32 telescopes over the cylindrical element 36 to guide the necessary axial motion of the plunger.

The coil spring 40 which surrounds and is supported by the cylindrical guide member 36, biases the collar 30 and its associated plunger 32 in an upward direction. However, the assembly of the plunger 32, pushbutton 34 and their associated elements are limited to two operating positions by virtue of the interengagement of the detenting finger 48 and the track 52 cut into the external face of one of the studs 76 of the camming collar 30. The detenting finger 48 is a length of spring steel which is bent at its upward end to form a loop 80 capable of retaining a screw fastener. The upper end of the leaf spring 50 is formed with an aligned opening 82, and a conventional screw fastener 84 passes through the opening 82 and the loop 80 to thread into a tapped opening 86 in facet 87 of the box like element 60 (see FIGS. 2, 3 and 5). The lower end of the detenting finger 48 is bent to form a tip 88 which rides around a heart-shaped path defined by the track 52. The lower end of the leaf spring 50 resiliently biases the tip 88 of the detenting finger 48 into engagement with the track 52.

Figures 6, 7, 8:
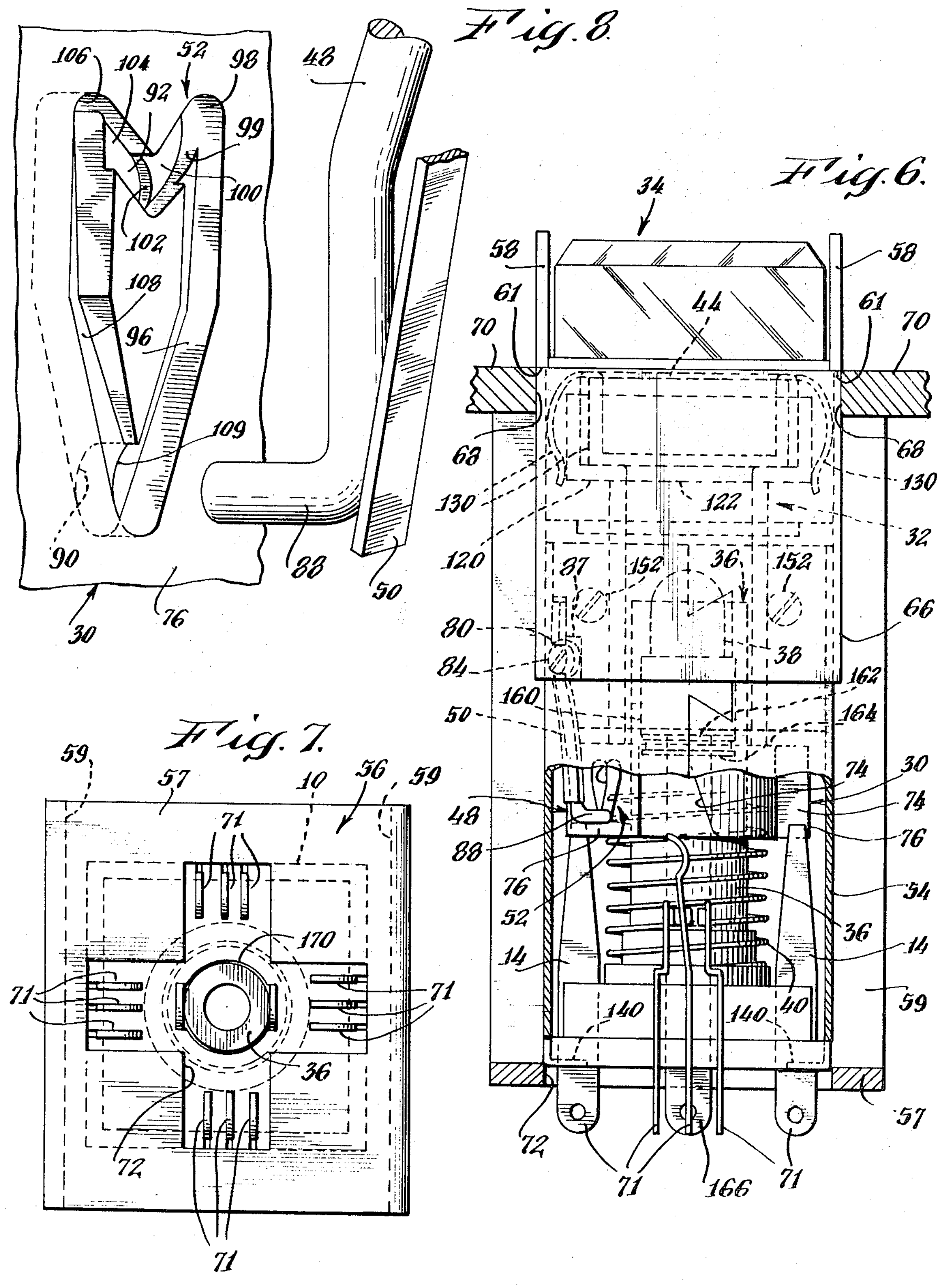
FIG. 6 is a side elevational view of the same switch, with parts broken away and sectioned for clarity of illustration.
FIG. 7 is a bottom plan view of the same switch.
FIG. 8 is an enlarged perspective view of the detenting mechanism of this switch.

As best seen in the enlarged view of FIG. 8, the cam track 52 comprises two detenting recesses 90 and 92. The lower detenting recess 90 is engaged by the detenting finger 88 when the assembly of the pushbutton 34 and plunger 32 is in its upper, or unactuated, position; i.e. when the camming collar 30 is above the level of the camming surfaces 14–1 of the electrical contact blades 14. The upper detenting recess 92 is engaged by the detenting finger 88 when the assembly of the pushbutton 34 and plunger 32 is in its lower, or actuated, position; i.e. when the camming surfaces 74 are forced against the curved surfaces 14–1 to deflect the electrical contact blades 14.

The engagement of the detenting finger 88 with either of the detenting recesses 90 or 92 restrains the assembly of the pushbutton 34 and plunger 32 in the associated operating positions against the upward urging of the biasing spring 40. When the switch is in the unactuated condition, the detenting finger 88 bears against the bottom surface of th recess 90 to restrain upward motion. If the pushbutton 34 and plunger 32 are then pressed downwardly to actuate the switch, the camming collar 30 and its lateral stud 76 upon which the cam track 52 is formed move downwardly, causing the detenting finger 88 to traverse upwardly through a track 96 which comprises one side of the heart-shaped configuration 52. The detenting finger is prevented from entering the opposite track section 108 instead by a ledge 109. The downward motion of the collar 30 just described terminates when the detecting finger 88 drops over a ledge 99 into the upper corner 98 of the heart-shaped track. Thereafter, when the pushbutton 34 is released, the upward biasing force exerted by the coil spring 40 causes the collar 30 to ride upwardly, whereupon the detenting finger 88 is prevented from riding back down the track section 96 by ledge 99, and instead is guided downwardly along a track section 100 forming one lobe of the heart-shaped configuration 52. This motion terminates when the detenting finger 88 drops over a step 102 and comes to rest against the bottom surface of the upper detenting recess 92; the switching mechanism then being in the downward or actuated position.

Subsequently, when it is desired to release the switch operating mechanism so that it can be biased back to its unactuated position, the pushbutton 34 and plunger 32 are manually driven downwardly. This causes the detenting finger 88 to ride upwardly out of the detenting recess 92 via an upward slanted track section 104 forming the other lobe of the heart-shaped configuration 52. The step 102 at the side edge of the detenting recess 92 then prevents the detenting finger 88 from riding back out along the opposite track section 100. Motion along track section 104 terminates when the detenting finger 88 drops over a step 107 into a corner 106 of the heart-shaped configuration 52. Thereafter, the pushbutton 34 is released allowing the coil spring 40 to bias the collar 30, plunger 32 and pushbutton 34 upwardly. When this happens, the detenting finger 88 is prevented from going back down the track section 104 by step 107, and instead is guided down along track section 108 until it drops over the ledge 109, back into the lower detenting recess 90.

When push-push switching operation is not desired, omission of detenting finger 48 and leaf spring 50 produces a switch assembly providing momentary switching operation.

In all these movements the pushbutton 34 and plunger 32 are held together by the assembling element 46. The plunger 32 is integrally formed with a rectangular box 120 at the upper end of the cylindrical tube 33. The box has an upward facing rectangular recess 121 into which the rectangular frame 122 of element 46 is inserted, making a frictional fit therewith to hold elements 46 and 120 in assembly. Projecting upwardly from the corners of the rectangular frame 122 are four curved plug fingers 124 which are frictionally received within respective curved corner recesses 126 at the four corners of a rectangular recess 128 formed in the underside of the plastic pushbutton 34 (see FIGS. 1, 3 and 4).

The radiation shielding element 42 lies immediately below the recess 128 of pushbutton 34. This element comprises the screen 44 which transmits light directed upwardly from the bulb 38 so that the translucent material of the pushbutton 34 is illuminated to create a visual display, yet effectively prevents the escape of radio frequency interference. The shield 42 also comprises four curved resilient depending flanges 130 at each one of the four sides of the rectangular screen 44. These flanges 130 make resilient sliding contact with the hangers 66 on two opposed sides of the switch enclosure and the panels 58 on the other two opposed sides of the enclosure. As the assembly of the pushbutton 34 and plunger 32 reciprocates through its functional movement, these flanges 130 maintain sliding contact all around the four sides of the enclosure for complete RFI shielding.

The shield 42 is held in assembled relationship with the pushbutton 34 by virtue of the fact that the four corner prongs 124 of the assembly element 46 project upwardly through gaps 132 which exist at the corners of the rectangular shielding screen 44 between adjacent flanges 130 of element 42. As previously noted, these prongs 124 are frictionally received within the corner recesses 126 of the pushbutton 34 for assembly therewith.

The inner can 54 is stamped from a flat sheet of metal, and includes projecting tabs 140, dovetail tongues 142 and mating dovetail recesses 144 at opposite ends of the flat sheet. Fastener apertures 146 are also punched into the inner shielding can 54 at the time of the stamping operation. The lower depending tabs are then bent to hook underneath the plastic base 10 when the switch mechanism is assembled (see FIGS. 3, 4 and 6). In addition, the flat sheet of the can 54 is bent into a box-like configuration and the dovetail tongues 142 are mated with the dovetail recesses 144 at opposite ends of the sheet to hold the can 54 in that configuration. The fastener holes 146 line up with fastener holes 150 formed in the hangers 66, and machine screws 152 (FIGS. 3 and 4) pass through the openings 150 and 146 and thread into tapped holes 154 formed in the box member 60 to assemble the hangers 66 and the inner can 54 with the box member 60. Another tapped hole 86 formed in the box member 60 receives the machine screw 84 which secures the detenting finger 48 and its leaf spring 50 in place against the surface 87 of box member 60. The opening 63 allows the pin 62 to pass through and engage the elongated slot 64 of plunger 32 so that plunger 32 and box member 60 are locked together against mutual rotation, but the plunger is allowed to perform its axial movement relative to the box member 60.

The light bulb 38 is screwed or mounted by a bayonet adapter fitting in a conventional lamp base 160 which is received within the hollow interior of the guide cylinder 36. Electrical contact rings 162 and 164 at the lower end of the lamp base 160 provide electrical power for the light bulb 38, and are energized by means of depending connecting pins 166 and 168 respectively which emerge from a central opening 170 at the bottom of the plastic base member 10.

With the foregoing detailed structural description as background, the reader is now in a position to appreciate how various metal elements of the switch enclosure serve to prevent the escape of radio frequency interference. Across the bottom of the switch, the central web 57 of the U-shaped container 56 serves to block the escape of RFI, except for the small amount that can escape through the cruciform opening 72. The later opening is required to give egress to the connecting pins 71 of the switching mechanisms 12, and the connecting pins 166 and 168 which energize the light bulb 38. The upstanding sides 59 of the U-shaped container and the hangers 66 complete the outer enclosure of the switch on two opposed sides, while the side panels 58 complete the outer enclosure on the other two opposed sides. The inner enclosure comprises the can 54 and the box-like member 60. The central opening 65 of the latter member, which is necessary to permit light from the bulb 38 to escape upwardly toward the illuminated pushbutton 34, is shielded by the screen 44 of the shielding member 42. At the four edges of the screen 44, the curved depending flanges 130 make resilient contact with the members 58 and 66 to close off the shielded enclosure on all four sides. Moreover, they maintain this contact slidingly throughout the reciprocating motion of the pushbutton 34 and its assembled elements as the switch is actuated.

It will therefore be appreciated that the present invention provides an electrical switching mechanism which is almost completely shielded against the escape of radio frequency interference, but in which such shielding does not interfere with internally supplied illumination of the switch, nor with the switching operation.

Since the foregoing description and drawings are merely illustrative, the scope of protection of the invention has been more broadly stated in the following claims; and these should be liberally interpreted so as to obtain the benefit of all equivalents to which the invention is fairly entitled.

The invention claimed is:

1. A shielded switch comprising (A) an electrical switching mechanism;

(B) a conductive can enclosing said mechanism on all sides, and open at least at one end;

(C) a pushbutton at said open end formed of an insulating material;

(D) a conductive shielding element inboard of said pushbutton and assembled therewith, said shielding element making slidable contact with the sidewalls of said can whereby to shield said open end; a plunger inboard of said shielding element and assembled with said pushbutton;

(E) means mounting said pushbutton and plunger assembly for axial motion relative to said can, and responsive to axial motion of said plunger for switching said mechanism.

2. A switch as in claim 1, further comprising a light source located inboard of said shielding element and directed at said pushbutton; said material of said pushbutton being light-transmissive, whereby to present an illuminated appearance externally of said can; said shielding element also being light-transmissive, whereby to permit light from said light source to reach said pushbutton.

3. A switch as in claim 2, wherein said shielding element comprises a metallic screen which transmits light through the pores thereof while providing a radiation shield.

4. A switch as in claim 3, wherein said pushbutton is formed with a recess facing into said can; said shielding element incorporates resilient flanges bearing resiliently against the interior surface of said can to establish a radiation shielding relationship therewith; said flanges being spaced to define gaps therebetween; said switch further comprising an assembling element formed with plug blades, said blades extending through respective ones of said gaps between said flanges into said pushbutton recess and making a friction fit with said pushbutton recess whereby to anchor said shielding element to said pushbutton; said assembling element comprising means extending into frictional engagement with said plunger whereby also to anchor said plunger to said pushbutton.

5. A switch as in claim 3, wherein said plunger comprises an axially projecting hollow stem; said switch further comprising means including a base secured relative to said can, and a hollow guide projecting axially from said base; said hollow stem being axially aligned and axially telescoping with said hollow guide whereby to guide axial motion of said pushbutton.

6. A switch as in claim 5, wherein said light source is located within said hollow guide and oriented to direct light axially through the interiors of said axially aligned hollow guide and hollow stem toward said shielding element and pushbutton.

7. A switch as in claim 6, further comprising camming means on said plunger including at least one camming surface sloped relative to said axial direction; said mechanism comprising at least one pair of contacts secured relative to said base; at least one of said contacts being driven through an electrical switching movement relative to the other of said contacts in response to axial motion of said camming surface.

8. A switch as in claim 7, further comprising spring means operating between said base and said pushbutton to bias said pushbutton axially; and a pair of means, one of which is on said pushbutton and the other of which is secured to said can, cooperating to detent said pushbutton in at least one of its axial positions against the bias of said spring means.

9. A switch as in claim 8, wherein one of said pair of detenting means comprises a pair of axially spaced detenting depressions; and the other of said detenting means comprises a spring-loaded finger engaging said depressions to establish respective detented positions; a pair of relieved tracks connecting said depressions to guide movement of said finger in respective opposite directions between said detenting depressions when said pushbutton is depressed and released respectively.

10. A switch as in claim 9, wherein both of said relieved tracks extend laterally beyond, and then curve back to, one of said detenting depressions to form a substantially valentine-shaped configuration.

11. A switch as in claim 10, further comprising a collar formed at the end of said plunger remote from said pushbutton; said camming surface, said detenting depressions and said relieved tracks being formed in said collar; said finger secured to the interior surface of said can.

References Cited

UNITED STATES PATENTS

| | | | |
|---|---|---|---|
| 2,956,446 | 10/1960 | Ensign et al. | 200—153 |
| 3,187,602 | 6/1965 | Cousins | 200—153 |
| 3,317,698 | 5/1967 | Mansfield | 200—168 |
| 3,437,775 | 4/1969 | Piber | 200—167 |
| 3,487,186 | 12/1969 | Johnson et al. | 200—168 |

HERMAN O. JONES, Primary Examiner

U.S. Cl. X.R.

200—153, 167